US012665725B2

(12) United States Patent
Hu et al.

(10) Patent No.: US 12,665,725 B2
(45) Date of Patent: Jun. 23, 2026

(54) SYSTEMS AND METHODS FOR PERFORMING HARQ FEEDBACK FOR UNLICENSED SIDELINK COMMUNICATIONS

(71) Applicant: Samsung Electronics Co., Ltd., Suwon-si (KR)

(72) Inventors: Liang Hu, San Diego, CA (US); Philippe Sartori, Naperville, IL (US); Yaser Fouad, San Diego, CA (US)

(73) Assignee: Samsung Display Co., Ltd., Suwon-si (KR)

( * ) Notice: Subject to any disclaimer, the term of this patent is extended or adjusted under 35 U.S.C. 154(b) by 479 days.

(21) Appl. No.: 17/964,711

(22) Filed: Oct. 12, 2022

(65) Prior Publication Data

US 2023/0148141 A1 May 11, 2023

Related U.S. Application Data

(60) Provisional application No. 63/276,951, filed on Nov. 8, 2021.

(51) Int. Cl.
| | |
|---|---|
| *H04L 5/00* | (2006.01) |
| *H04L 1/1812* | (2023.01) |
| *H04W 74/0808* | (2024.01) |
| *H04W 92/18* | (2009.01) |

(52) U.S. Cl.
CPC .......... *H04L 5/0055* (2013.01); *H04L 1/1812* (2013.01); *H04W 74/0808* (2013.01); *H04W 92/18* (2013.01)

(58) Field of Classification Search
CPC ... H04L 5/0055; H04L 1/1812; H04L 1/1825; H04W 74/0808; H04W 92/18; H04W 72/121; H04W 72/21
See application file for complete search history.

(56) References Cited

U.S. PATENT DOCUMENTS

| | | | |
|---|---|---|---|
| 11,356,212 B2 | 6/2022 | Park et al. | |
| 12,302,394 B2 * | 5/2025 | Huang | H04W 74/002 |
| 2021/0320759 A1 | 10/2021 | Lee et al. | |
| 2021/0320760 A1 | 10/2021 | Rastegardoost et al. | |

(Continued)

FOREIGN PATENT DOCUMENTS

| | | | |
|---|---|---|---|
| TW | 202135557 A | 9/2021 | |
| WO | 2021/071331 A1 | 4/2021 | |
| WO | WO-2022182502 A1 * | 9/2022 | H04L 1/20 |

OTHER PUBLICATIONS

Taiwanese Office Action dated Apr. 15, 2026, issued in corresponding Taiwanese Patent Application No. 111142430 (8 pages).

*Primary Examiner* — Edan Orgad
(74) *Attorney, Agent, or Firm* — Womble Bond Dickinson (US) LLP

(57) ABSTRACT

According to an embodiment of the present disclosure, a system and a method may include receiving, by a first user equipment (UE), configuration information for physical sidelink feedback channel (PSFCH) resources; performing, by the first UE in response to the receiving, a first listen-before-talk (LBT) sensing for a first PSFCH resource of the PSFCH resources; and determining that the first LBT sensing failed and in response, transmitting a signal over a second PSFCH resource of the PSFCH resources.

24 Claims, 9 Drawing Sheets

F1: CONTROL PATH

F1: DATA PATH gNB    UE1    UE2

A. CONTROL PATH AND DATA PATH ON SAME FREQUENCY

F1: CONTROL PATH

F2: DATA PATH gNB    UE1    UE2

B. CONTROL PATH AND DATA PATH ON DIFFERENT FREQUENCIES

(56)                    References Cited

U.S. PATENT DOCUMENTS

| | | | |
|---|---|---|---|
| 2021/0400704 A1 | 12/2021 | Xue et al. | |
| 2022/0029747 A1 | 1/2022 | Xue et al. | |
| 2022/0029755 A1 | 1/2022 | Park et al. | |
| 2022/0070921 A1* | 3/2022 | Xue | H04W 72/044 |
| 2022/0085921 A1 | 3/2022 | Zhang et al. | |
| 2022/0353945 A1* | 11/2022 | Liu | H04W 76/28 |
| 2023/0014182 A1* | 1/2023 | Jia | H04L 5/0064 |
| 2023/0171774 A1* | 6/2023 | Liu | H04L 1/1607 |
| | | | 370/329 |
| 2024/0064713 A1* | 2/2024 | Sun | H04W 72/25 |
| 2024/0397528 A1* | 11/2024 | Zhao | H04W 4/40 |
| 2025/0150212 A1* | 5/2025 | Pan | H04L 1/188 |
| 2025/0274911 A1* | 8/2025 | Lei | H04W 74/002 |
| 2026/0006625 A1* | 1/2026 | Lei | H04W 72/25 |

* cited by examiner

ONE RB

ONE SUBCHANNEL

EMPTY RESOURCE

GAP SYMBOL

PSFCH

PSCCH

PSSCH DMRS

PSSCH

FIRST SYMBOL FOR AGC TRAINING IS COPY OF THE SECOND SYMBOL

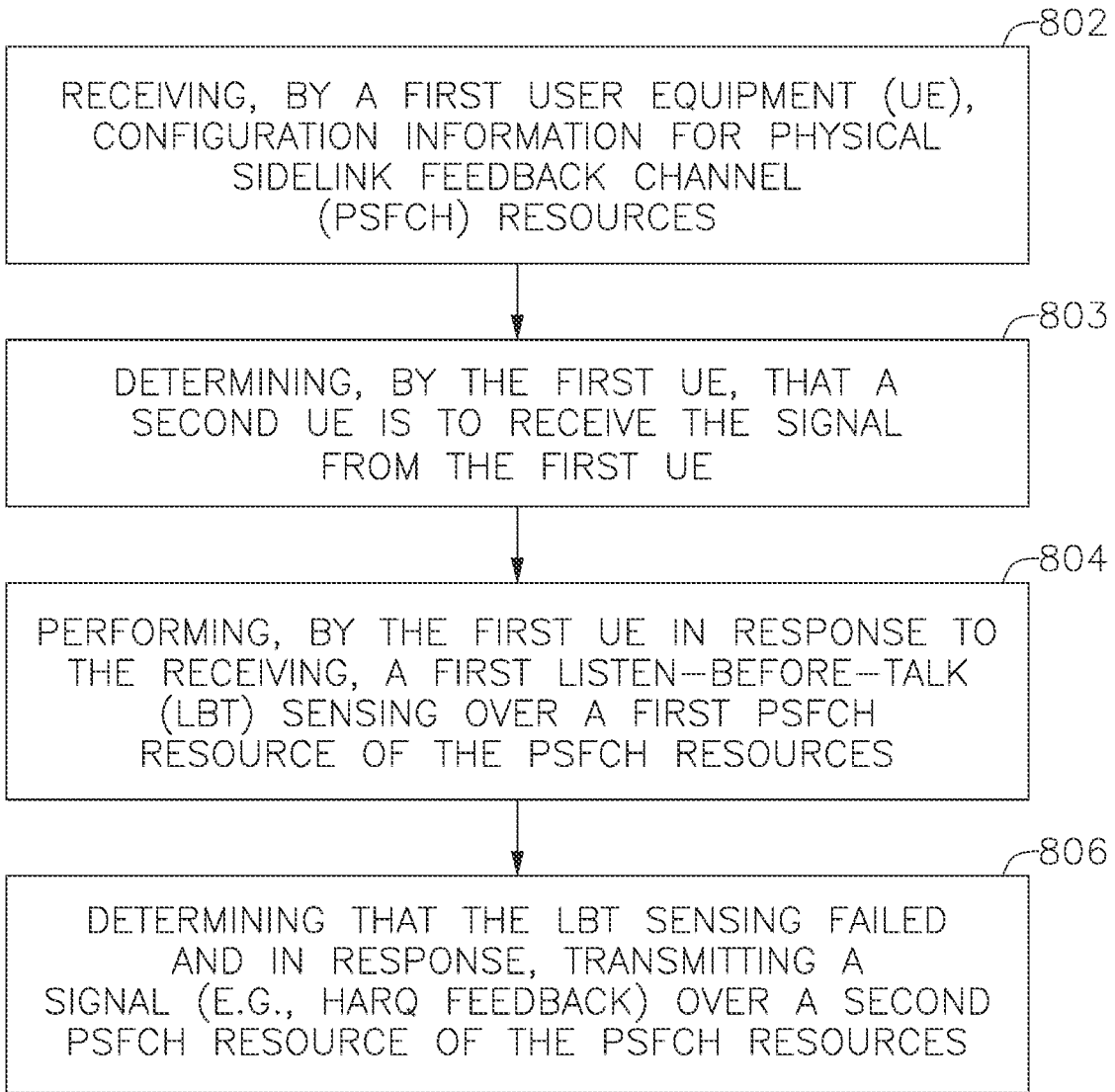

RECEIVING, BY A FIRST USER EQUIPMENT (UE), CONFIGURATION INFORMATION FOR PHYSICAL SIDELINK FEEDBACK CHANNEL (PSFCH) RESOURCES ⟨802

DETERMINING, BY THE FIRST UE, THAT A SECOND UE IS TO RECEIVE THE SIGNAL FROM THE FIRST UE ⟨803

PERFORMING, BY THE FIRST UE IN RESPONSE TO THE RECEIVING, A FIRST LISTEN—BEFORE—TALK (LBT) SENSING OVER A FIRST PSFCH RESOURCE OF THE PSFCH RESOURCES ⟨804

DETERMINING THAT THE LBT SENSING FAILED AND IN RESPONSE, TRANSMITTING A SIGNAL (E.G., HARQ FEEDBACK) OVER A SECOND PSFCH RESOURCE OF THE PSFCH RESOURCES ⟨806

SYSTEMS AND METHODS FOR PERFORMING HARQ FEEDBACK FOR UNLICENSED SIDELINK COMMUNICATIONS

This application claims the priority benefit under 35 U.S.C. § 119(e) of U.S. Provisional Patent Application No. 63/276,951, filed on Nov. 8, 2021, the disclosure of which is incorporated by reference in its entirety as if fully set forth herein.

TECHNICAL FIELD

This disclosure generally relates to new radio (NR) unlicensed sidelink communications. More particularly, the subject matter disclosed herein relates to improvements to systems and methods for performing HARQ feedback for unlicensed sidelink communications.

SUMMARY

Up to Rel-17 in 5G NR, 3GPP sidelink specifications were directed to public safety and vehicle-to-vehicle (V2V) over intelligent transport system (ITS) band. However, in more recently published white papers such as the 3GPP TR 22.842, "Study on Network Controlled Interactive Service (NCIS) in the 5G System (5GS)", December 2019, which is incorporated herein by reference in its entirety, interactive services such as interactive gaming, data sharing between various kinds of terminals such as mobile phones, virtual reality (VR)/artificial reality (AR) devices and robots are being considered for sidelink usages. Many of these interactive services take place locally in nature, and may benefit from the integration of cellular communications with sidelink communications. For network controlled interactive services (NCIS) such as those described in 3GPP TR 22.842, data path and control paths may be deployed either on the cellular link (e.g., the Uu link) or on the sidelink (e.g., the PC5 link). FIG. 1 illustrates an example of such system architecture, where most of the control plane is transmitted through the network, while most of the data and some of the control information is transmitted on the sidelink.

Unlicensed bands in 5/6 GHz band and 60 GHz band provide relatively large additional bandwidth and flexibility to enable sidelink data transmission. Consequently, future releases such as in Rel-18, 3GPP may standardize sidelink communication in the unlicensed band. However, to legitimately enable proximity services (ProSe) in the unlicensed bands, existing and/or future regulation requirements must be satisfied.

One aspect is directed to a method in which a hybrid automatic repeat request (HARQ) feedback is sent from one user equipment (UE) to another UE. For example, in Rel-17 and earlier, the UE transmitting the packet assigned resources to the receiving UE to transmit an acknowledgement/negative-acknowledge (ACK/NAK) feedback. But, in the unlicensed spectrum, the receiving UEs transmitting the ACK/NACK need to access certain channels in order to send the ACK/NACK feedback. Thus, the existing Rel 16/17 procedures for ACK/NAK feedback on the sidelink may not be applied in the same manner.

Accordingly, embodiments of the present disclosure are directed to methods for sending the HARQ in 5G NR SL unlicensed spectrums.

According to an embodiment of the present disclosure, a method may include receiving, by a first user equipment (UE), configuration information for physical sidelink feedback channel (PSFCH) resources; performing, by the first UE in response to the receiving, a first listen-before-talk (LBT) sensing for a first PSFCH resource of the PSFCH resources; and determining that the first LBT sensing failed and in response, transmitting a signal over a second PSFCH resource of the PSFCH resources.

The method may further include determining, by the first UE, that a second UE is to receive the signal from the first UE.

The signal may be a hybrid automatic repeat request (HARQ) feedback signal.

The first PSFCH resource and the second PSFCH resource may be mapped to a single physical sidelink shared data channel (PSSCH).

The method may further include determining that one or more short control exemptions are available, and wherein the transmitting the signal over the second PSFCH resource is performed in response to the determining that one or more short control exemptions are available, without performing a second LBT sensing on the second PSFCH resource.

The method may further include, in response to the determining that the LBT sensing for the first PSFCH resource failed, performing, by the first UE, a second LBT sensing for the second PSFCH resource.

The second LBT sensing may be performed before transmitting the signal over the second PSFCH.

The transmitting the signal over the second PSFCH resource may be performed in response to the determining that the LBT sensing for the second PSFCH resource succeeded.

The signal may be performed during a sidelink communication over unlicensed frequency bands.

The second PSFCH resource may be within a channel occupancy time (COT) shared by the first UE and the second UE, the method further including transmitting, by the first UE, the signal on the shared COT.

The transmitting the signal over the second PSFCH resource may be performed without performing LBT sensing on the second PSFCH resource.

The method may further include, in response to the determining that the first LBT sensing failed, transmitting the signal on a sideline control information (SCI) channel.

According to another embodiment of the present disclosure, a system may include a first user equipment (UE). The UE may include: a radio; and a processing circuit, wherein the processing circuit is configured to: receive configuration information for physical sidelink feedback channel (PSFCH) resources; perform, in response to receiving the configuration information, a first listen-before-talk (LBT) sensing for a first PSFCH resource of the PSFCH resources; and determine that the first LBT sensing failed and in response, transmit a signal over a second PSFCH resource of the PSFCH resources.

The processing circuit may be further configured to determine that a second UE is to receive the signal from the first UE.

The signal may be a hybrid automatic repeat request (HARQ) feedback signal.

The first PSFCH resource and the second PSFCH resource may be mapped to a single physical sidelink shared data channel (PSSCH).

The processing circuit may be further configured to determine that one or more short control exemptions are available, and wherein the transmitting the signal over the second PSFCH resource is performed in response to the determining that one or more short control exemptions are available, without performing a second LBT sensing on the second PSFCH resource.

In response to the determination that the LBT sensing for the first PSFCH resource failed, the processing circuit may be further configured to perform a second LBT sensing for the second PSFCH resource.

The processing circuit may be further configured to perform the second LBT sensing before transmitting the signal over the second PSFCH.

In response to the determination that the LBT sensing for the second PSFCH resource succeeded, the processing circuit may be further configured to transmit the signal over the second PSFCH resource.

The signal may be performed during a sidelink communication over unlicensed frequency bands.

The second PSFCH resource may be within a channel occupancy time (COT) shared by the first UE and the second UE, and the processing circuit is further configured to transmit the signal on the shared COT.

The transmitting of the signal over the second PSFCH resource may be performed without performing LBT sensing on the second PSFCH resource.

In response to the determination that the first LBT sensing failed, the processing circuit may be further configured to transmit the signal on a sideline control information (SCI) channel.

BRIEF DESCRIPTION OF THE DRAWING

In the following section, aspects of the subject matter disclosed herein will be described with reference to exemplary embodiments illustrated in the figures.

FIG. 7 is a graphical illustration of an example of SL PSSCH and PSFCH resource mapping for type-2 groupcast with m Rx UEs, according to various embodiments of the present disclosure.

FIG. 8 is a flow chart of a method for providing HARQ feedback during sidelink unlicensed communications, according to various embodiments of the present disclosure.

DETAILED DESCRIPTION

Figure 1:
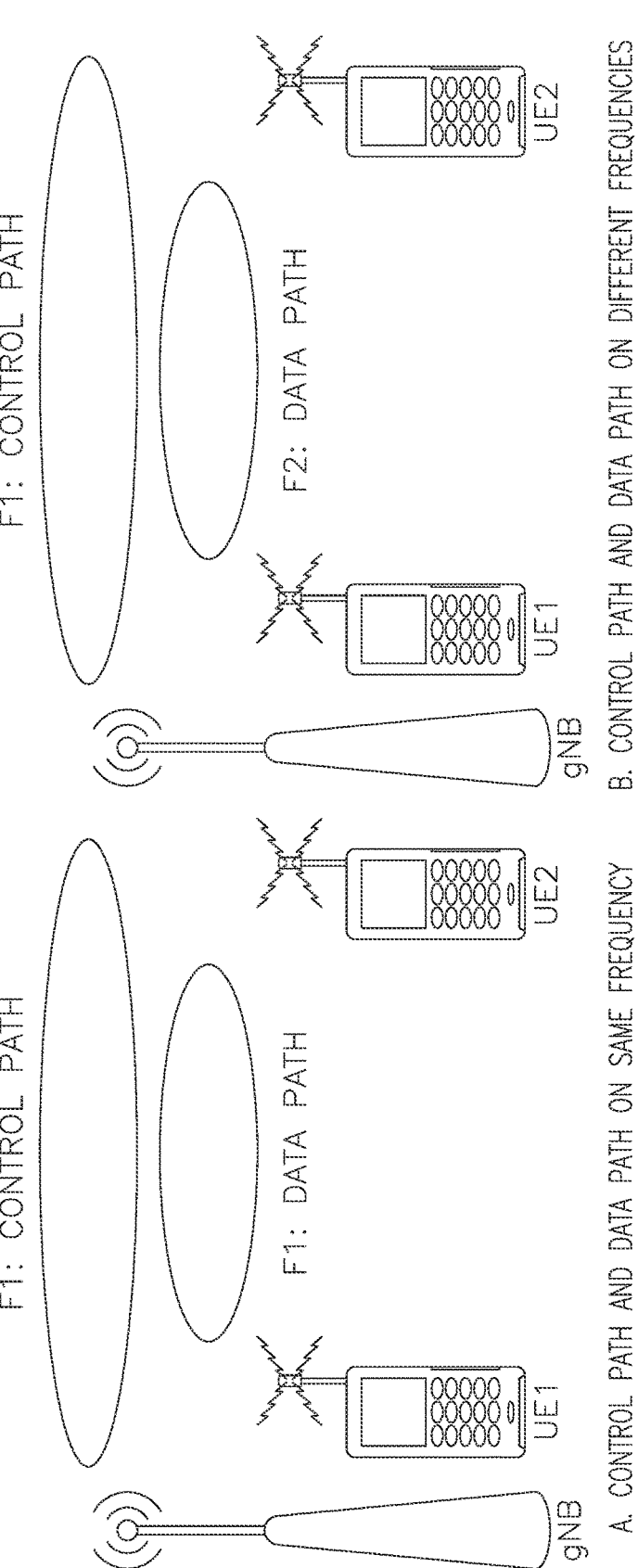
FIG. 1 an example system including user equipment (UE) and network nodes (gNB), where information may be transmitted over sidelinks between the UEs or the information may be transmitted via the gNBs, according to various embodiments of the present disclosure.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

A physical sidelink feedback channel (PSFCH) is a physical channel in a 5G NR system that is used to transmit feedback information from the receiving (Rx) UE to the transmitting (Tx) UE. In some embodiments, it may be used for unicast and/or groupcast options 1 and 2. In the case of unicast and groupcast option 2, the PSFCH is used to transmit ACK/NACK, and in the case of groupcast option 1, the PSFCH carries only NACK. For sidelink feedback, a sequence-based PSFCH format (e.g., PSFCH format 0) with one symbol (not including automatic gain control (AGC) training period) is supported.

In PSFCH format 0, the ACK/NACK bit may be transmitted through two Zadoff-Chu (ZC) sequences of length 12 (e.g., same root but different cyclic shift), whereby a presence of one sequence may indicate an ACK and a presence of another sequence may indicate a NACK. Thus, these sequences may be used in a mutually exclusive manner.

Accordingly, because sequences are used to convey the ACK/NACK to the Tx UE, feedback from multiple UEs may be multiplexed on the same physical resource block (PRB). Thus, in some embodiments, up to 6 ACK/NACKs from 6 UEs may be multiplexed on the same PRB (e.g., 12 subcarriers) by using different cyclic shifts. This number may be decided based on resource pool configuration such as, numMuxCSPair. In this case, each UE may be assigned a same root sequence but two cyclic shifts (e.g., one for ACK and another for NACK).

In some embodiments, code division multiplexing (CDM)-based format may be used due to the case of groupcast option 2 in which multiple ACK/NACK feedbacks are expected from different UEs per physical sidelink shared control channel (PSSCH) transmission. For groupcast option 2, ACK/NACKs from different UEs may be transmitted on the same PRB by allocating two different sequences for each UE to use for its ACK/NACK transmissions. In this case the sequences and the PRB used by each UE may depend on a unique ID. On the other hand, for groupcast option 1, only a NACK is required and thus the cyclic shift corresponding to the ACK message may not be used and all UEs included in the groupcast may use the same sequence and PRB for NACK.

Figure 2:
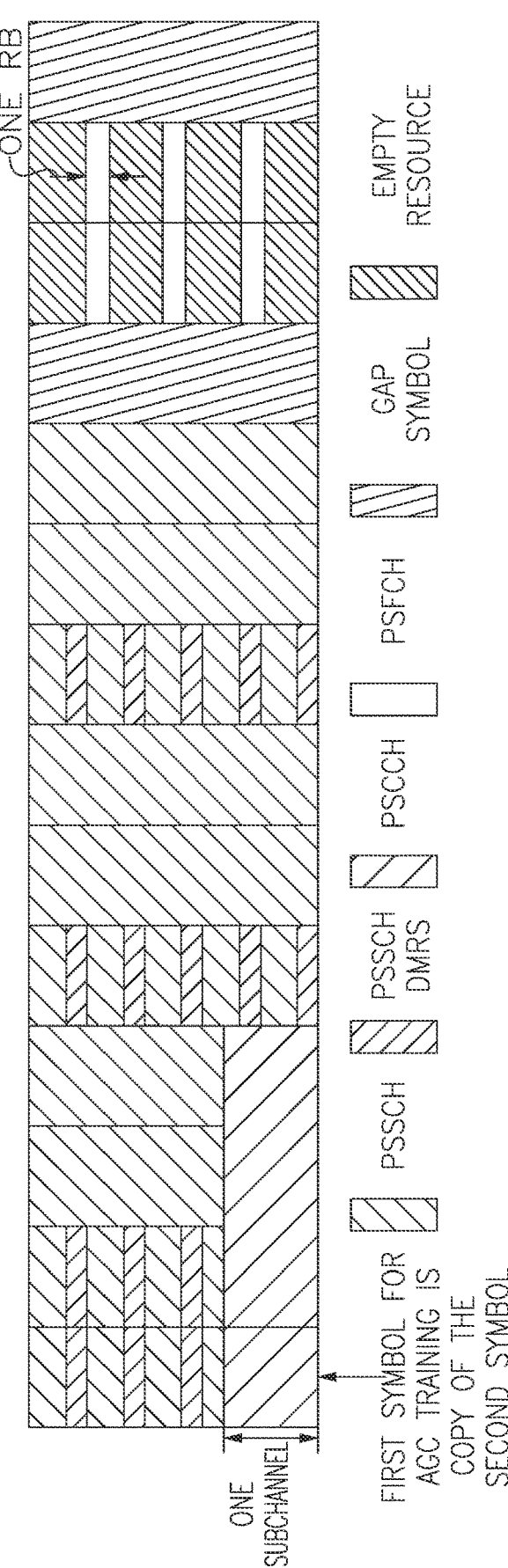
FIG. 2 is a graphical illustration of PSFCH symbols in a slot in a resource pool, according to various embodiments of the present disclosure.

In some embodiments, to support AGC, the resource elements used for the PSFCH may be duplicated in the immediately preceding orthogonal frequency division multiplexing (OFDM) symbol. Thus, two consecutive symbols may always be used for transmission of PSFCH format 0. Subsequently, the first symbol may be used for AGC training after the Tx/Rx switch. Moreover, at least one symbol may be used for a gap after the PSSCH transmission and another symbol may be used after the PSFCH transmission to allow for Tx/Rx switching as shown in FIG. 2.

For a period comprising N slot(s) of PSFCH resource, three values may be supported (e.g., N=1, N=2, and N=4). These values define the periodicity of the PSFCH resource and subsequently, its associated overhead. For a PSSCH transmission with its last symbol in slot n, when the corresponding HARQ feedback is due for transmission, it is expected to be in slot n+a, where a is the smallest integer equal to or greater than K logical slots (e.g., slots within the PSSCH resource pool) with the condition that slot n+a includes PSFCH resources and K is equal to 2 or 3.

According to Rel-16 Sidelink HARQ in TS 38.213, a UE may be indicated by a sideline control information (SCI) format scheduling a PSSCH reception, in one or more sub-channels from a number of $$N_{subch}^{PSSCH}$$

sub-channels, to transmit a PSFCH with HARQ-ACK information in response to the PSSCH reception. The UE provides HARQ-ACK information that includes ACK or NACK, or only NACK.

A UE may be provided, by sl-PSFCH-Period-r16, which corresponds to the number of slots in a resource pool for a period of PSFCH transmission occasion resources. If the number is zero, PSFCH transmissions from the UE in the resource pool may be disabled.

A UE expects that a slot $$t_k^{'SL}$$

$(0 \le k < T'_{max})$ has a PSFCH transmission occasion resource if k mod $$N_{PSSCH}^{PSFCH} = 0, \text{ where } t_k^{'SL}$$

is defined in TS 38.214, and $T'_{max}$ is a number of slots that belong to the resource pool within 10240 msec according to TS 38.214, and $$N_{PSSCH}^{PSFCH}$$

is provided by sl-PSFCH-Period-r16.

A UE may be indicated by higher layers to not transmit a PSFCH in response to a PSSCH reception according to TS 38.321.

If a UE receives a PSSCH in a resource pool and the HARQ feedback enabled/disabled indicator field in an associated SCI format 2-A or a SCI format 2-B has a value 1 according to TS 38.212, the UE may provide the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

A UE may be provided by sl-PSFCH-RB-Set-r16 a set of $$M_{PRB,set}^{PSFCH}$$

PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $$N_{PSSCH}^{PSFCH},$$

the UE allocates the $$\left[ \left( i + j \cdot N_{PSSCH}^{PSFCH} \right) \cdot M_{subch,slot}^{PSFCH}, \left( i + 1 + j \cdot N_{PSSCH}^{PSFCH} \right) \cdot M_{subch,slot}^{PSFCH} - 1 \right]$$

PRBs from the $$M_{PRB,set}^{PSFCH}$$

PRBs to slot i among the PSSCH slots associated with the PSFCH slot and sub-channel j, where $$M_{subch,slot}^{PSFCH} = M_{PRB,set}^{PSFCH} / \left( N_{subch} \cdot N_{PSSCH}^{PSFCH} \right), 0 \le i < N_{PSSCH}^{PSFCH}, 0 \le j < N_{subch},$$

and the allocation starts in an ascending order of i and continues in an ascending order of j. The UE expects that $$M_{PRB,set}^{PSFCH}$$

is a multiple of $$N_{subch} \cdot N_{PSSCH}^{PSFCH}.$$

A UE may determine the number of PSFCH resources that are available for multiplexing HARQ-ACK information in a PSFCH transmission as $$R_{PRB,CS}^{PSFCH} = N_{type}^{PSFCH} \cdot M_{subch,slot}^{PSFCH} \cdot N_{CS}^{PSFCH},$$

where $$N_{CS}^{PSFCH}$$

is the number of cyclic shift pairs for the resource pool and, based on an indication by higher layers:

$$N_{type}^{PSFCH} = 1$$

and the $$M_{subch,slot}^{PSFCH}$$

PRBs are associated with the starting sub-channel of the corresponding PSSCH; and $$N_{type}^{PSFCH} = N_{subch}^{PSSCH}$$

and the N $$N_{subch}^{PSSCH} \cdot M_{subch,slot}^{PSFCH}$$

PRBs are associated with one or more sub-channels from the $$N_{subch}^{PSSCH}$$

sub-channels of the corresponding PSSCH.

The PSFCH resources may be first indexed according to an ascending order of the PRB index, from the $$N_{type}^{PSFCH} \cdot M_{subch,slot}^{PSFCH}$$

PRBs, and then accordin to an ascending order of the cyclic shift pair index from the $$N_{CS}^{PSFCH}$$

cyclic shift pairs.

A UE may determine an index of a PSFCH resource for a PSFCH transmission in response to a PSSCH reception as $$(P_{ID} + M_{ID}) \bmod R_{PRB,CS}^{PSFCH},$$

where $P_{ID}$ is a physical layer source ID provided by SCI format 2-A or 2-B according to TS 38.212 scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE may determine a $m_0$ value, for computing a value of cyclic shift $\alpha$ according to TS 38.211, from a cyclic shift pair index corresponding to a PSFCH resource index and from $$N_{CS}^{PSFCH}$$

using Table 1.

TABLE 1

| $N_{CS}^{PSFCH}$ | $m_0$ | | | | | |
|---|---|---|---|---|---|---|
| | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE may determine a $m_{cs}$ value, for computing a value of cyclic shift $\alpha$ according to TS 38.211, as in Table 2 if the UE detects a SCI format 2-A with Cast type indicator field value of "01" or "10", or as in Table 3 if the UE detects a SCI format 2-B or a SCI format 2-A with Cast type indicator field value of "11". The UE may apply one cyclic shift from a cyclic shift pair to a sequence used for the PSFCH transmission according to TS 38.211.

TABLE 2

| HARQ-ACK Value | 0 (NACK) | 1 (ACK) |
|---|---|---|
| Sequence cyclic shift | 0 | 6 |

TABLE 3

| HARQ-ACK Value | 0 (NACK) | 1 (ACK) |
|---|---|---|
| Sequence cyclic shift | 0 | N/A |

In some embodiments, NR Vehicle-to-X (V2X) supports ACK/NACK feedback for the SL HARQ feedback in unicast. That is, a Rx UE sends an ACK if it has successfully decoded the transport block (TB) carried in a PSSCH or it sends a NACK if it has not decoded the TB after decoding the 1st-stage SCI. For groupcast, two options (e.g., option 1 and option 2) may be supported for the SL HARQ feedback in NR V2X.

For option 1, a Rx UE transmits a NACK if it has not successfully decoded the TB (after decoding the 1st-stage SCI) and if the relative distance to the Tx UE from the Rx UE (referred as Tx-Rx distance) is less than or equal to the required communication range (e.g., as indicated in the 2nd-stage SCI). Otherwise, the Rx UE does not transmit any HARQ feedback. Because the HARQ feedback for this option consists of only NACK, option 1 may be referred to as NACK-only feedback. Thus, in option 1, Rx UEs do not transmit HARQ feedback because they have either successfully decoded a TB or because they are outside the minimum required communication range (even if they did not successfully decode the TB).

In some embodiments, option 2 for groupcast supports the ACK/NACK feedback from all Rx UEs. That is, a Rx UE sends an ACK if it has successfully decoded the TB or it sends a NACK if it has not decoded the TB, after decoding the 1st-stage SCI.

For unicast or any of the groupcast options, a Rx UE does not send a reply if the Rx UE does not decode the 1st-stage SCI. With option 1, the Rx UEs of a transmission shares a resource for sending their NACK-only feedback, while with option 2 each Rx UE sends its ACK/NACK feedback on a separate resource. Thus, with option 1 a Tx UE cannot identify which Rx UEs sent a NACK. If a Tx UE receives at least one NACK with option 1, the Tx UE is aware that at least one Rx UE within the required communication range did not correctly decode the transmission. In addition, if a Tx UE receives no reply with option 1, it may be unable to distinguish whether the Rx UEs within the required communication range have successfully received the transmission or if some have not successfully decoded the corresponding 1st-stage SCI. On the other hand, a Tx UE can distinguish the HARQ feedback of the Rx UEs with option 2. This enables the Tx UE to perform a retransmission that is tailored to specific Rx UE(s). Thus, with option 2, if a Tx UE receives no reply on the feedback resource corresponding to a given Rx UE, the Tx UE may be aware that the Rx UE has not successfully decoded the corresponding 1st-stage SCI. Consequently, option 2 enables higher reliability for transmissions. However, the advantages of option 2 over option 1 may come at the expense of more resources that are required for the groupcast HARQ feedback.

In NR V2X, the use of HARQ feedback and the choice of whether to use option 1 or option 2 for groupcast HARQ feedback may be determined based on UE implementation. For groupcast communications, the Tx UE indicates in the 2nd-stage SCI whether NACK-only feedback (option 1) or ACK/NACK feedback (option 2) should be used. NACK-only feedback may be considered for groupcast services where the provided information may not be so relevant for Rx UEs outside the communication range. For groupcast option 1, the Tx-Rx distance may be obtained at the Rx UE based on the location of the Tx UE. This location may be indicated via the Tx UE's zone ID carried in the 2nd-stage SCI.

The Tx-Rx distance may be derived at the Rx UE based on its own location and the center of the nearest zone with the indicated zone ID. In some embodiments, HARQ feedback for a TB that is sent on a PSSCH in a resource pool may be carried on a PSFCH within the same resource pool. To disable the HARQ feedback for all SL transmissions in the resource pool, no resources for PSFCH may be configured within the resource pool. Resources for PSFCH can be configured or preconfigured periodically with a period of N=1, 2 or 4 slot(s). That is, a PSCCH/PSSCH slot with a PSFCH symbol may be available for every N slots within the resource pool. Thus, even if resources for PSFCH are configured or preconfigured, the 2nd-stage SCI may indicate whether HARQ feedback is enabled or not for a TB sent in a given PSSCH.

In some embodiments, one PRB may be used for a PSFCH transmission. In one PRB, NR V2X supports CDM between PSFCH transmissions of multiple Rx UEs. Thus, with CDM, multiple transmissions share the same frequency resource simultaneously. Thus, the transmissions may employ signals with low cross correlation (e.g., orthogonally). Consequently, this property allows for a receiver to distinguish uncorrelated transmission signals that have been sent on the same time and frequency resources. Signals with low cross correlation may be generated from a periodic root or base sequence that has very high autocorrelation properties.

In some embodiments, a set of uncorrelated signals for CDM can be generated from cyclically shifted versions of the base sequence. Thus, the base sequence used for PSFCH may be configured per resource pool in NR V2X and it may correspond to a Zadoff-Chu sequence based on a format used for physical uplink control channel (PUCCH) in Rel. 15 NR Uu. In a PRB used for PSFCH, the transmissions that can be multiplexed with CDM may correspond to the HARQ feedback from several Rx UEs. Thus, CDM may also be used to distinguish the ACK or NACK feedback from a Rx UE in the same PRB. Thus, a pair of cyclic shifts (within a PRB) may be used to distinguish the ACK or NACK from an Rx UE. The cyclic shift corresponding to ACK is not defined in the case of NACK-only feedback for groupcast (option 1). Thus, each PSFCH in NR V2X may be mapped to a time resource (PSFCH symbol), a frequency resource (one PRB), and a code resource (one cyclic shift among a cyclic shift pair).

Listen before talk (LBT) is a method that requires a UE to listen for a response before utilizing a channel. For example, 3GPP has specified four LBT categories for NR-unlicensed for single channel access:

Category 1 (Cat 1 LBT): Immediate transmission after a short switching gap of 16 us.

Category 2 (Cat 2 LBT): LBT without random back-off, in which the CCA period is deterministic (e.g., fixed to 25 us).

Category 3 (Cat 3 LBT): LBT with random back-off with a contention window of fixed size, in which the extended CCA period is drawn by a random number within a fixed contention window.

Category 4 (Cat 4 LBT): LBT with random back-off with a contention window of variable size, in which the extended CCA period is drawn by a random number within a contention window, whose size can vary based on channel dynamics.

After a successful LBT, a device can access the channel at most for the duration of the MCOT (e.g., 9 ms in the 60 GHz band). The NR frame structure inherently allows NR unlicensed (NR-U) to transmit and receive in a more efficient manner compared to LTE in unlicensed spectrum technologies because of the numerologies, mini-slots, and flexible slot structure. For example, the channel occupancy time (COT) can be shared between a gNB and its UEs to achieve a higher spectral efficiency and faster responses under bidirectional transmissions.

In some embodiments, different categories can be used for different transmissions in a COT and various channels and/or signals to be transmitted. Thus, as in license assisted access (LAA), Cat 4 LBT may be used for gNB or UE to initiate a COT for data transmissions, while gNB can use Cat 2 LBT for specific signaling like discovery reference signals. In some embodiments, the rules for shared COT have also been defined for NR-U. For a gNB initiated COT, the responding devices are allowed to transmit without performing a CCA check (e.g., Cat 1 LBT) if there is a gap in between downlink (DL) and uplink (UL) transmissions of less than 16 μs. For a gap of more than 16 ps but less than 25 us, within the COT, only a short sensing (e.g., Cat 2 LBT) is needed at the responding devices. Otherwise, if the gap is longer than 25 μs, regular LBT (e.g., Cat 4 LBT for data) must be done at responding devices. Moreover, differently to LAA that supported a single DL/UL switching point within the COT, NR-U supports multiple DL/UL switching points within the COT.

The Regulation on Short Control Signaling as provided in ETSI EN 301 V2.1.1 section 4.2.7.3.3 regarding short control signaling transmissions states that general frame-based equipment and load based equipment may have short control signaling transmissions on the operating channel provided that these transmissions comply with the requirements in clause 4.2.7.3.3. It may not be required for adaptive equipment to implement short control signaling transmissions. Short control signaling transmissions are transmissions used by the equipment to send management and control frames without sensing the channel for the presence of other signals. Use of short control signaling transmissions is constrained to within an observation period of 50 ms, the number of short control signaling transmissions by the equipment shall be equal to or less than 50 and the total duration of the equipment's short control signaling transmissions shall be less than two 500 μs within the observation period.

Embodiments of the present disclosure are directed to the support of sidelink on unlicensed spectrum for both mode 1 and mode 2 where Uu operation for mode 1 may be limited to licensed spectrum. The embodiments are also directed to evaluation methodology for sidelink operation on unlicensed spectrum, sidelink channel access mechanism for unlicensed spectrum based on regional regulation requirement and use the existing channel success schemes from NR-U as a starting point by reusing Rel-16 resource allocation mechanism to the extent possible, changes to NR sidelink physical channel structures and procedures to operate on unlicensed spectrum without specific optimizations for existing NR SL features, frequency bands for the unlicensed spectrum in FR1 are 5 GHz and 6 GHz, and no specific optimizations for FR2 unlicensed spectrum.

Accordingly, in NR SL communications techniques, at least HARQ ACK/NACK are sent to the source UE (e.g., Tx UE and also referred to herein as UE A) on the PSFCH. The PSFCH is sent on some slots after data transmission and one symbol guard time. However, in the unlicensed spectrum, the Rx UE needs to perform LBT before accessing the PSFCH. But, if the LBT fails, the Rx UE cannot send the ACK/NACK on the PSFCH.

Figure 3:
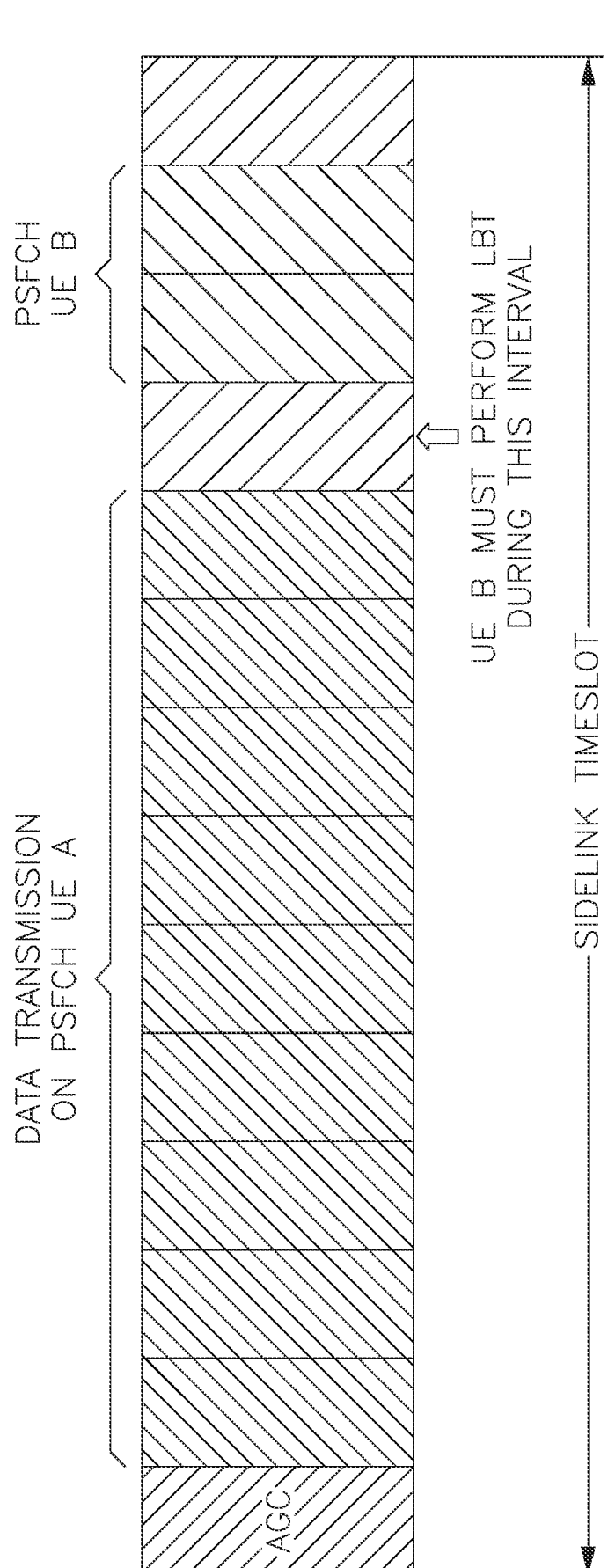
FIG. 3 is a graphical illustration of an example SL HARQ in an unlicensed band where UE A communicates with UE B, according to various embodiments of the present disclosure.

FIG. 3 is an illustration of an example SL HARQ in an unlicensed band where UE A communicates with UE B. As illustrated, UE B must perform LBT during the indicated interval before it can access the PSFCH.

Under the Rel-16 NR SL design, there is one-to-one mapping between PSSCH transmission and PSFCH transmission. Thus, if the LBT fails before the PSFCH transmission, UE B has no other opportunity to provide HARQ ACK/NACK to the transmitter. While the transmitter (e.g., UE A) can assume a HARQ NACK when it does not receive anything on the PSFCH, this is highly inefficient and significantly reduces the throughput. Consequently, there is a need to develop new HARQ feedback procedures in the unlicensed spectrum. Accordingly, various embodiments of the present disclosure provide techniques to improve the efficiency of NR SL HARQ ACK/NACK transmissions over unlicensed spectrum, for example, in the FR1 unlicensed spectrum for NR SL. Thus, a more reliable HARQ feedback may be provided to the source UE (e.g., Tx UE or UE A).

According to an embodiment of the present disclosure, instead of providing one PSFCH resource for the ACK/NAK feedback, multiple resources may be provided, for example, two PSFCH resources. The Rx UE that is sending the ACK/NACK feedback may first attempt to access the channel with the use of LBT for the first PSFCH resource. If access is successfully obtained, then the Rx UE may send the HARQ feedback on this first PSFCH resource. If access is not successfully obtained, then the Rx UE may perform LBT again and attempt to access the second subsequent PSFCH resource, and so forth, if this should not succeed again. For purposes of this disclosure, two PSFCH resources are used to describe the techniques according to this embodiment. However, it should be noted that the techniques are not limited to just two resources but instead, there may be more than two PSFCH resources as suitable, in which case a similar process may be follow for each subsequently available PSFCH resource.

Figure 4:
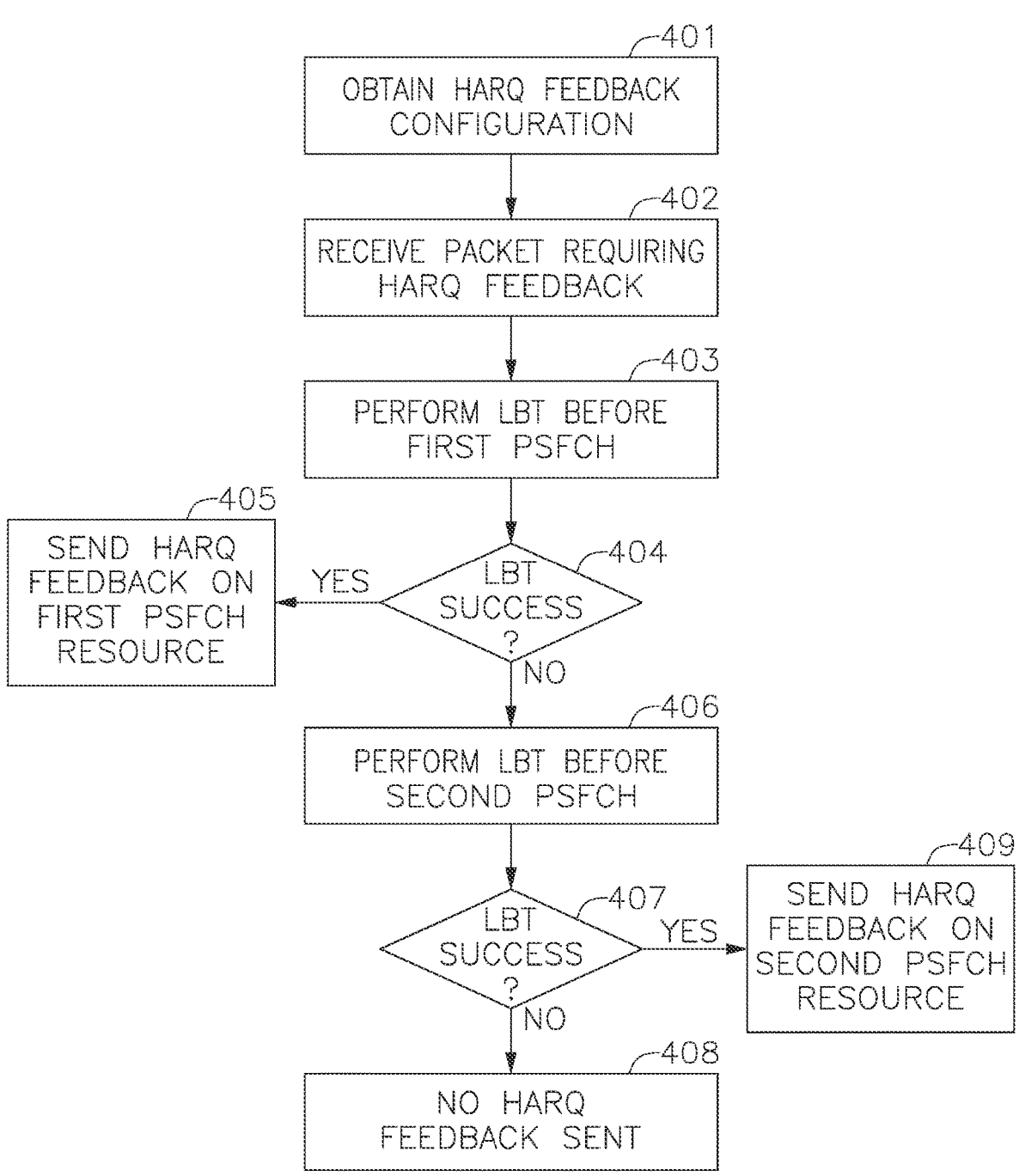
FIG. 4 is a flow chart of a process for providing HARQ feedback ACK/NACK according to various embodiments of the present disclosure.

FIG. 4 is a flow chart of a process for providing HARQ feedback ACK/NACK according to various embodiments of the present disclosure. At step 401, a Rx UE first obtains a HARQ feedback configuration. The configuration may include information such as how and when to send the HARQ feedback. Thus, according to the embodiments of the present disclosure, the configuration may include at least two PSFCH resources. The PSFCH configuration for a first (primary) PSFCH resource may indicate where to send the HARQ feedback for the resource pool, and the PSFCH configuration for the second (secondary) and/or subsequent PSFCH resources may indicate where to send the HARQ feedback if the first PSFCH resource cannot be used (e.g., because of LBT failure). In some embodiments, the HARQ feedback configuration may also include any other information according to the Rel-16/17 procedures, which will not be described in detail here. This information can be sent using RRC signaling, MAC CE signaling, physical layer signaling SCI, etc. In some embodiments, the configuration information may already be preconfigured, e.g., during manufacturing of the UEs. Yet in some embodiments, the Tx UE may also obtain the HARQ feedback configuration, which includes the same information that the Rx UE obtained as described above.

At step 402, the Rx UE monitors the PSCCH and receives an indication that the Rx UE is going to receive a packet from a Tx UE that is going to require sending a HARQ feedback using PSFCH resources according to Rel-16/17 procedures.

At step 403, the LBT is performed before the first PSFCH resource. Based on the packet assignment, the Rx UE determines which resources it should use for sending the HARQ feedback on the first (primary) PSFCH resource, and then determines where to perform LBT. The Rx UE may perform Cat 4 LBT in the gap symbol before first PSFCH transmissions.

At step 404, the Rx UE performs LBT and determines if the LBT succeeded in time. In some embodiments, the acceptable length of time may be determined by the configuration from step 401. For example, the time may be a threshold time limit within which the LBT is performed, and if the LBT is completed successfully within the time limit, then the LBT may be considered a success.

If the LBT succeeded in time, then at step 405, the Rx UE then sends the HARQ feedback on the first PSFCH resource. If, on the other hand, the LBT did not succeed in time, then at step 406, the Rx UE determines other resources on the secondary PSFCH resource and then determines where to perform the LBT. The Rx UE may then perform, for example, a Cat 4 LBT in the gap symbol before the first PSFCH transmissions, and the Rx UE may again determine at step 407, if the LBT succeeds in time on the second PSFCH resource. If the LBT succeeds in time, then at step 408, the HARQ feedback may be sent to the Tx UE on second PSFCH resource. On the other hand, if the second LBT did not succeed (e.g., the second LBT failed), then at step 409, the Rx UE does not send anything on the PSFCH. Consequently, the Tx UE on the other side of the link (i.e., the source UE) assumes that packet transmission has failed. If there are additional PSFCH resources, steps 406-409 may be repeated again until an LBT is performed successfully and then the HARQ feedback may be sent to the Tx UE on the PSFCH. Thus, by providing multiple PSFCH resources for the HARQ feedback configuration, the probability of a successful LBT is increased, thus increasing the probability of sending the HARQ feedback to the Tx UE.

Figure 5:
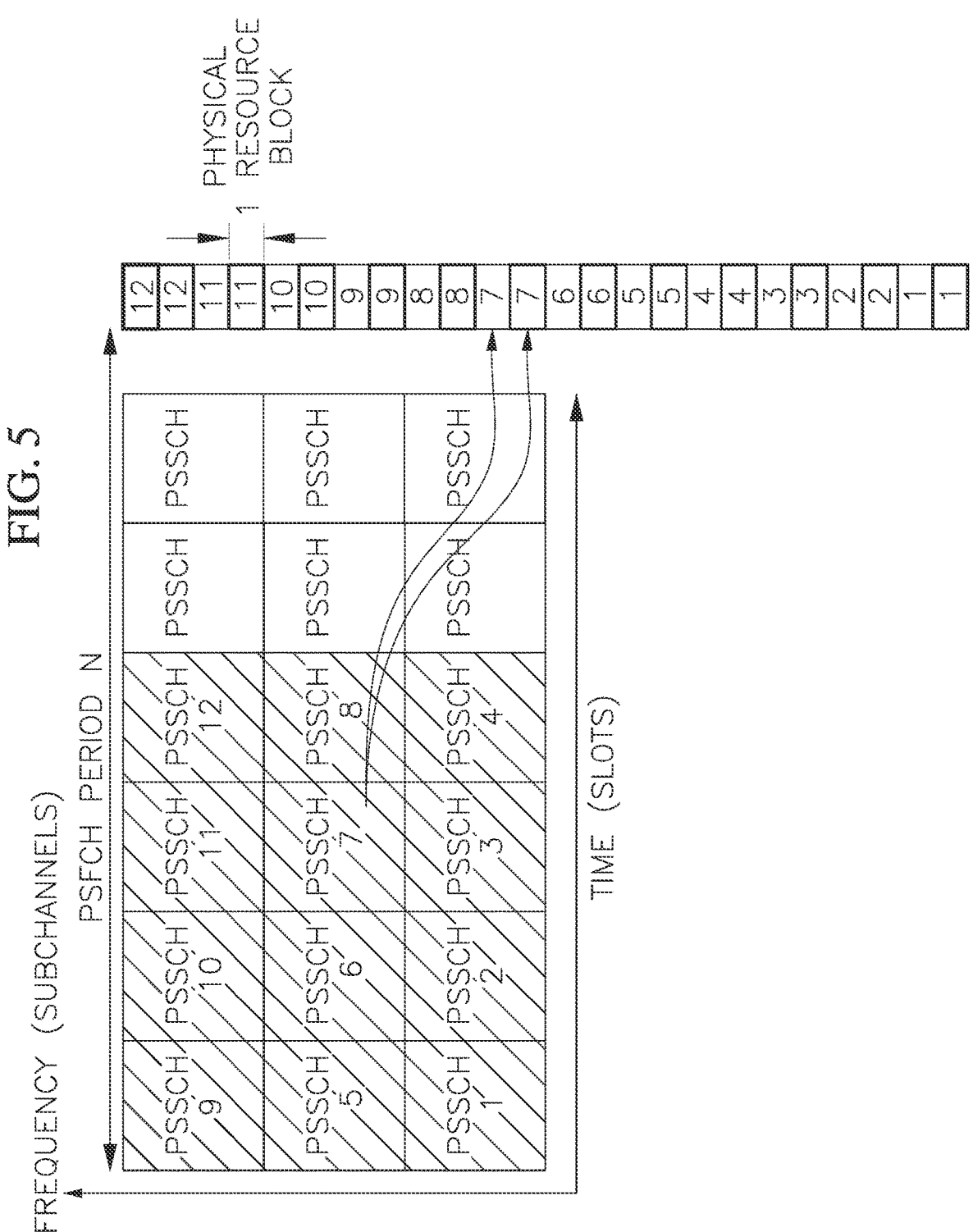
FIG. 5 is a graphical illustration of an example of a SL PSSCH and PSFCH resource mapping scheme for a type-2 groupcast including two Rx UEs, according to various embodiments of the present disclosure.

FIG. 5 is an illustration of an example of a SL PSSCH and PSFCH resource mapping scheme for a type-2 groupcast including two Rx UEs. One aspect of the embodiments of the present disclosure is directed to mapping one HARQ feedback to multiple PSFCH occasions/resources. Thus, when only one PSFCH occasion is mapped to one PSSCH transmission, there is a one-to-one mapping between the PSSCH resource and the PSFCH occasion/resource, as illustrated in FIG. 5. When two PSFCH occasions/resources are possible, a one-to-two mapping may be obtained by extending the one-to-one mapping of single PSFCH in a straightforward manner. Herein the present disclosure, "mapping" a PSSCH resource to a PSFCH resource may be defined as aligning or assigning a PSSCH resource to a corresponding PSFCH resource so that other UEs will not select the same PSFCH resource, which would create a collision. Accordingly, each UE may be able to find the corresponding PSFCH resource for a given PSSCH resource so that data transmission may be performed.

In particular, FIG. 5 shows the frequency and time resource allocation of Rel-16 SL PSSCH and PSFCH resource mapping for type-2 groupcast having at most, two Rx UEs, where the vertical axis grids correspond to the frequency resource in terms of sub-channels and the horizontal axis grids correspond to the time resource in terms of slots. The PSFCH occasion periodicity may be configured as N. According to Rel-16 PSFCH configuration mapping, each of the indexed PSSCH transmissions from 1 to 12 may be mapped, respectively, to the one corresponding PSFCH resource including two PRBs indexed in the grids. For example, PSSCH 7 has two corresponding indexed PRBs of PSFCH resource, each being allocated for one of the two Rx UEs.

Figure 6:
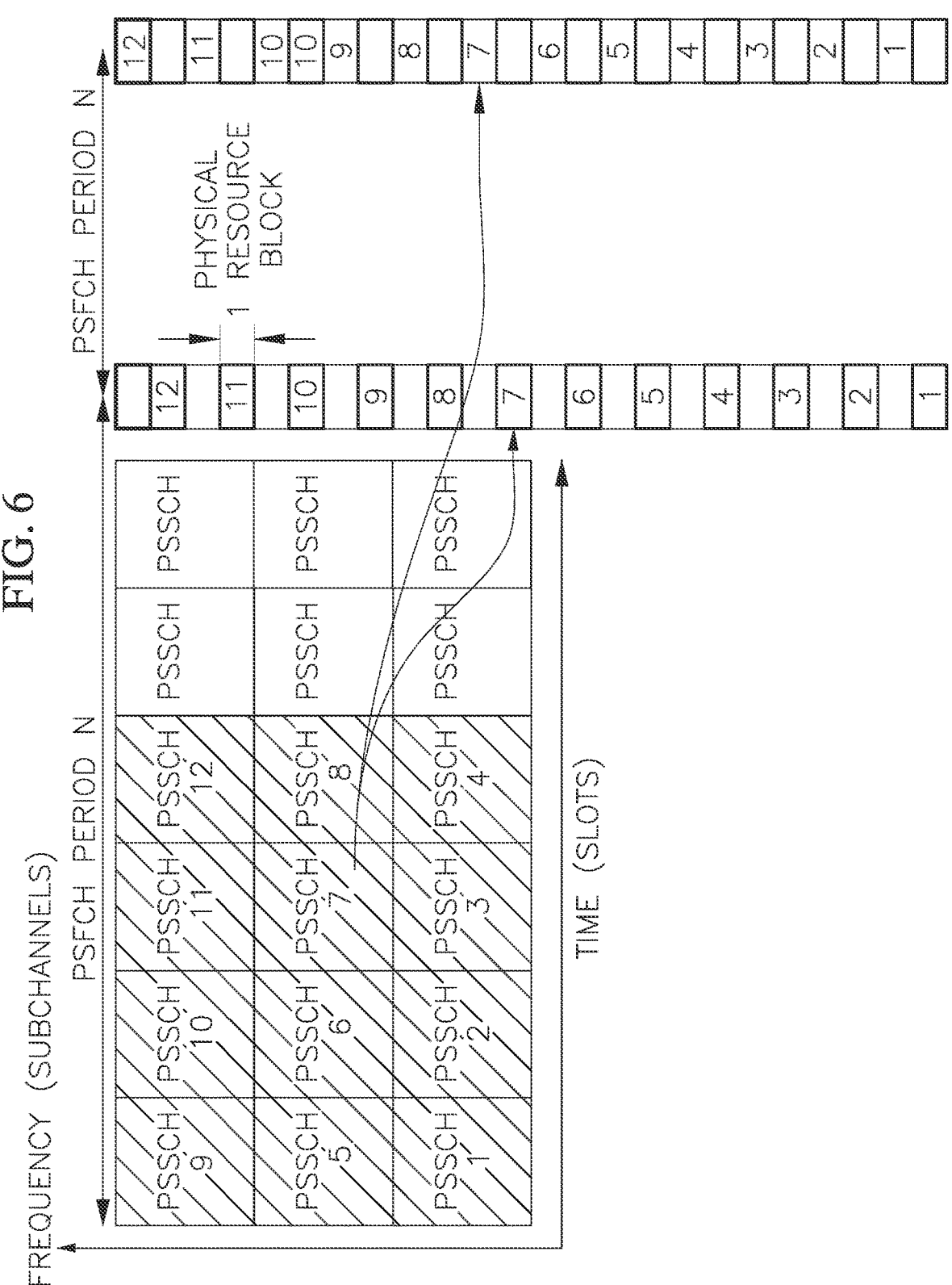
FIG. 6 is a graphical illustration of an example of SL PSSCH and PSFCH resource mapping for type-2 groupcast with one Rx UE, according to various embodiments of the present disclosure.

FIG. 6 is an illustration of an example of SL PSSCH and PSFCH resource mapping for type-2 groupcast with one Rx UE, wherein the vertical axis grids correspond to the frequency resources in terms of sub-channels and the horizontal axis grids correspond to the time resources in terms of slots. The PSFCH occasion periodicity may be configured as N. Accordingly, each of the indexed PSSCH transmissions from 1 to 12 may be mapped, respectively, to two corresponding PSFCH resources comprising one PRB indexed in each one of the two PSFCH occasions. For example, PSSCH 7 has two corresponding PRBs of PSFCH resources in two PSFCH occasions, each of which is allocated for the same Rx UE to cope in case the LBT performance fails to succeed.

Figure 7:
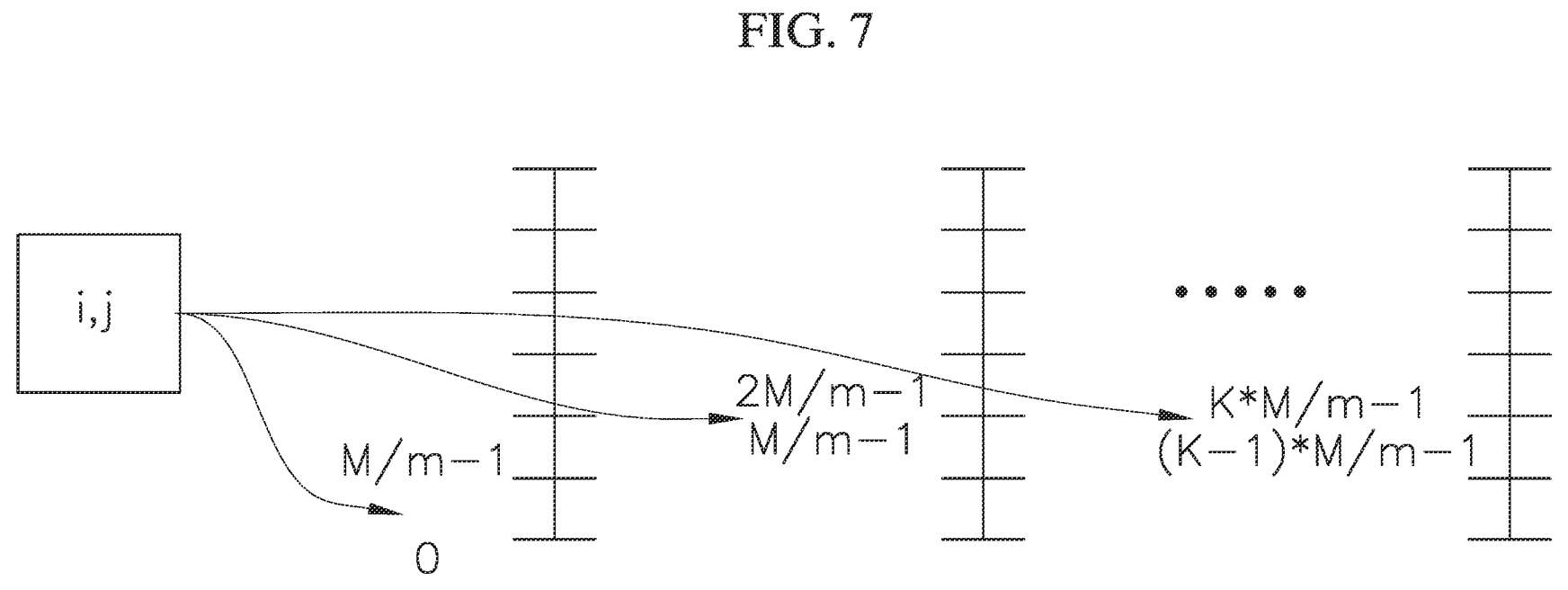

More in particular, the embodiments of the present disclosure is directed to configuring a "1" to "m" mapping between one PSSCH transmission and m candidate PSFCH transmissions in "m" consecutive PSFCH occasions as shown in FIG. 7.

FIG. 7 is an illustration of an example of SL PSSCH and PSFCH resource mapping for type-2 groupcast with m Rx UEs. Accordingly, the mapping is configured such that the receiver UE sends an ACK/NACK to the Tx UE if the LBT is successful. Otherwise, the Rx UE enters a back-off procedure of Cat 4 LBT procedure, and does not send the ACK/NACK to the Tx Ue. The Rx UE may then try the Cat 4 LBT again and send an ACK/NACK in the next PSFCH occasion if the LBT is successful this time. Otherwise, the Rx UE enters into the back-off procedure again. Accordingly, the Rx UE may continue to try the Cat 4 LBT again and again in the next m candidate PSFCH occasion(s). If the LBT at the Rx UE is successful in one candidate PSFCH occasion, then the Rx UE sends the ACK/NACK to the Tx UE and no longer needs to try the remaining candidate PSFCH occasions.

In some situations, the Rx UE may not complete the back-off procedure of the previous PFSCH occasion even at the current PFSCH occasion. In this case, the Rx UE may continue performing the back-off procedure of the previous PSFCH occasion instead of performing a new Cat 4 LBT in the current PSFCH occasion. Accordingly, the design of SL-U HARQ may be enabled by configuring the 1" to "m" mapping between one PSSCH transmission and m candidate PSFCH transmissions in "m" consecutive PSFCH occasions.

In some embodiments, a UE may be provided by sl-PSFCH-RB-Set-r16 a set of $$M_{PRB,set}^{PSFCH}$$

PRBs in a resource pool for PSFCH transmission in a PRB of the resource pool. For a number of $N_{subch}$ sub-channels for the resource pool, provided by sl-NumSubchannel, and a number of PSSCH slots associated with a 1st PSFCH slot that is less than or equal to $$N_{PSSCH}^{PSFCH},$$

the UE allocates $$\left[ \left( i + j \cdot N_{PSSCH}^{PSFCH} \right) \cdot M_{subch,slot}^{PSFCH}, \left( i + j \cdot N_{PSSCH}^{PSFCH} \right) \cdot M_{subch,slot}^{PSFCH} + M_{subch,slot}^{PSFCH} \Big/ m - 1 \right]$$

PRBs from the $$M_{PRB,set}^{PSFCH}$$

PRBs to slot i among the PSSCH slots associated with the PSFCH slot and sub-channel j, where $$M_{subch,slot}^{PSFCH} = M_{PRB,set}^{PSFCH} \Big/ \left( N_{subch} \cdot N_{PSSCH}^{PSFCH} \right), 0 \le i < N_{PSSCH}^{PSFCH}, 0 \le j < N_{subch},$$

and the allocation starts in an ascending order of i and continues in an ascending order of j. The UE expects that $$M_{PRB,set}^{PSFCH}$$

is a multiple of $$N_{subch} \cdot N_{PSSCH}^{PSFCH}.$$

In the 2nd PSFCH slot after the 1st PSFCH slot, the UE may also allocate the $$\left[ \left( i + j \cdot N_{PSSCH}^{PSFCH} \right) \cdot M_{subch,slot}^{PSFCH} + \frac{M_{subch,slot}^{PSFCH}}{m} - 1, \right.$$

$$\left. \left( i + j \cdot N_{PSSCH}^{PSFCH} \right) \cdot M_{subch,slot}^{PSFCH} + 2 \cdot \frac{M_{subch,slot}^{PSFCH}}{m} - 1 \right]$$

PRBs from the $$M_{PRB,set}^{PSFCH}$$

PRBs to slot i among the PSSCH slots associated with the PSFCH slot and sub-channel j in the 1st PFSCH slot, where $$M_{subch,slot}^{PSFCH} = M_{PRB,set}^{PSFCH} \Big/ \left( N_{subch} \cdot N_{PSSCH}^{PSFCH} \right), 0 \le i < N_{PSSCH}^{PSFCH}, 0 \le j < N_{subch},$$

and the allocation starts in an ascending order of i and continues in an ascending order of j. The UE expects that $$M_{PRB,set}^{PSFCH}$$

is a multiple of $$N_{subch} \cdot N_{PSSCH}^{PSFCH}.$$

In the $K^{nd}$ PSFCH slot after the 1st PSFCH slot, the UE may also allocate the $$\left[ \left( i + j \cdot N_{PSSCH}^{PSFCH} \right) \cdot M_{subch,slot}^{PSFCH} + (K-1) \frac{M_{subch,slot}^{PSFCH}}{m} - 1, \right.$$

$$\left. \left( i + j \cdot N_{PSSCH}^{PSFCH} \right) \cdot M_{subch,slot}^{PSFCH} + K \cdot \frac{M_{subch,slot}^{PSFCH}}{m} - 1 \right],$$

where 1≤K≤m.

In some embodiments, in case of groupcast option 2, particularly when the PSFCH periodicity >1, there may be a possibility that PSFCH resources may be limited by resource pool configuration. For example, given that there are now PSFCH resources per subchannel/slot, the number of UEs (e.g., the maximum number of UEs) that may be accommodated with groupcast option 2 may be reduced from N to N/K. According to another embodiment, an offset may be opportunistically applied. For example, the 2nd or 3rd PSFCH repetition instances may start in the second PRB in the first subchannel occupied by a Unicast transmission because these resources are not utilized by default in the case of groupcast option 2. In yet another embodiment, the number of receivers (e.g., the maximum number of receivers) in groupcast option 2 may be limited or down-scaled by the resource pool configuration, such that there is sufficient PSFCH resources for supporting groupcast option 2.

According to another embodiment of the present disclosure, a short control exemption may be utilized for sending the HARQ feedback. As described above, if the LBT by the Rx UE fails to succeed, the HARQ ACK/NACK may be sent by utilizing the short control exemption without LBT.

More in particular, the "1" to "m" mapping between one PSSCH transmission and m candidate PSFCH transmissions in "m" consecutive PSFCH occasions may be supplemented by p number of short control exemption PSFCH transmission attempts of a given Rx UE for every X number of total SL transmissions of that given Rx UE, including PSSCH, PSCCH, PSBCH and PSFCH transmissions.

In some embodiments, a 2nd possible restriction may be within an observation period of 50 ms, the number of Short Control Signaling Transmissions by the Rx UE may be equal to or less than 50, and the total duration of the Rx UE's Short Control Signaling Transmissions may be less than 50 ms within the observation period. Accordingly, the Rx UE may first attempt to send the HARQ ACK/NACK via m candidate PSFCH occasions by performing LBT channel access. If it does not succeed in LBT for all available m PSFCH occasions, the Rx UE may then check whether there are any remaining short control exemption PSFCH transmission opportunities left. In other words, p number of short control exemption transmissions per X number of total SL transmission at the Rx UE or under the 2nd possible restriction as described above. If there are any short control exemption PSFCH transmission opportunities left, then the short control exemption may be utilized to transmit the HARQ ACK/NACK at the m+1 PSFCH occasion without LBT, if the priority of the corresponding TB transmitted in PSSCH is greater than a predefined threshold. In some embodiments, the Rx UE may apply the short control signaling exemption to transmit the HARQ ACK/NACK at a PSFCH occasion before the m PSFCH occasion to maintain a delay budget of a given TB with a tight latency requirement.

In some embodiments, the above described approach may be reversed. In other words, the Rx UE may start with the "p" non-LBT attempts (if the above two restrictions are met regarding the short control signaling transmissions), followed by the "m" LBT-based attempts. This technique may allow for faster access to the PSFCH resources. This approach may be available to higher priority UEs that have limited delay budgets (e.g., URLLC traffic). In some embodiments, this technique may also be used by all UEs, but the number of "p" non-LBT attempts may depend on traffic priority. The non-LBT "p" may be considered as a subset of the "m" PSFCH attempts from the NR system perspective. In particular, a UE may have access to "m"

PSFCH resources per PSSCH transmission within which it applies the LBT in a subset "p."

According to another embodiment of the present disclosure, the HARQ feedback may utilize COT sharing. According to this technique, it is assumed that UE A (e.g., Tx UE) expects a HARQ feedback from UE B (e.g, Rx UE). After data transmission by UE A, UE A COT-shares the resource with UE B. UE B transmits PSFCH without LBT or with one shot LBT. Thus, UE A assumes that the UE B will send the ACK/NACK in the same slot in which the UE A sent the data transmission after receiving the PSSCH. Accordingly, the UE B is required to process the PSSCH immediately and provide the PSFCH with a separation of one symbol only.

Thus, when Rx UE has the capability of fast processing PSCCH/PSSCH and can send the HARQ feedback within the same slot of the Tx UE, and if the PSFCH resource is configured within the same slot of the PSSCH transmission, the Rx UE may transmit the HARQ feedback in the PSFCH resource of the same slot without performing LBT channel access or without performing the Cat 2 LBT channel access if the gap symbol between the PSSCH and AGC symbol is less than a set or predetermined threshold. When the gap symbol is larger than the threshold, the Rx UE may optionally use an extended cyclic prefix of transmitting the AGC ahead of time in the last part of the gap symbol, such that the gap in the gap symbol becomes lower than the threshold.

In some embodiments, if the Tx UE in the above description intends to transmit to another different Rx UE, the different Rx UE may still perform the above procedures provided that: 1) the Tx UE explicitly indicates in the SCI or medium access control control element (MAC CE) the set of Rx UE IDs or group IDs that may use the shared COT for transmitting their HARQ feedbacks; 2) the Tx UE indicates explicitly in the SCI or MAC CE that any Rx UE can use the shared COT for transmitting their HARQ feedbacks; and 3) implicitly all Rx UEs are preconfigured to be able to use the shared COT from any Tx UE for transmitting their HARQ feedbacks. In some embodiments, there can be a bit field in SCI or MAC CE to indicate COT-sharing at the Tx UE for doing PSFCH by the Rx UEs.

In some embodiments, the UE B (e.g., Rx UE) may be allowed to send a reservation signal if no other SL UEs are reserved for the following/target slot. In this case, UE B can send the HARQ ACK/NACK after decoding the PSSCH, which may be in the later slots than the slot where PSSCH is received. If another UE C reserved the following/target slot in which UE B intends to send the HARQ ACK/NACK, then UE B may share the COT from the UE C and occupy the PSFCH for transmitting its ACK/NACK without LBT. Additionally, a UE B can start the LBT earlier at the beginning of the slot to increase the chances of channel acquisition when it cannot perform the COT sharing from other UEs, where a reservation signal will be needed to maintain the channel once UE B acquires the channel for sending the HARQ ACK/NACK.

According to another embodiment of the present disclosure, the HARQ feedback may be sent in an SCI. For example, UE B (e.g., Rx UE) may send the ACK/NACK in an SCI addressed to UE A (e.g., Tx UE). The SCI may be used to send either the HARQ feedback alone (e.g., by using a standalone SCI), or when UE A sends data. A field in the second stage SCI may be added to convey the ACK/NACK. In some embodiments, one or more ACK/NACK may be sent, and feedback may be sent for one or more HARQ process numbers. In some embodiments, the UE B can send HARQ feedback for all the HARQ processes at once, with the feedback for the non-used HARQ processes ignored (e.g., analogous to HARQ codebook type 1). In such case, the SCI feedback size may be fixed. According to yet another embodiment, the HARQ feedback may be sent only for the HARQ processes that are being used. In this case, the SCI size may be variable, but known by the UE B (assuming that no transmission has been missed). To avoid any size mismatch, Downlink Assignment Index (DAI) type fields may be included.

Accordingly, the UE B does not require a specific LBT for sending the HARQ feedback, but this technique may be applied only if the UE has data to transmit. Accordingly, this technique may be most suitable for traffic that is more or less symmetric. In some embodiments, the ACK/NACK may also be carried in the PSSCH as a MAC CE. This may be particularly useful (although not limited to) in cases when UE A is the target UE for another TB transmission. In this case, the MAC CE may indicate the specific HARQ process information for which UE B is providing the ACK or NACK. This MAC CE may also be sent along with the SCI indication to notify UE A of the existence of HARQ feedback. In another embodiment, the HARQ feedback may be multiplexed with data in a manner similar to SCI. This may possibly require a flag in the SCI to indicate that there is HARQ feedback multiplexed with the data.

It should be noted that the above described techniques may be utilized on its own or they may be combined with any one or more of the above described techniques in an effort to improve efficiency and reliability. For example, the Rx UE may be configured with a first PSFCH and a second PSFCH, and the Rx UE may attempt to perform LBT before the first PSFCH. If the LBT succeeds, then the primary PSFCH may be utilized to send the HARQ feedback. If the LBT fails to succeed, and if the Rx UE has to transmit data and the latency for sending HARQ feedback can be satisfied, the Rx UE may send the HARQ feedback in the SCI and skip the LBT before the second PSFCH. Furthermore, if the short control exception can be used, the Rx UE may transmit the HARQ feedback even if LBT fails.

FIG. 8 is a flow chart of a method for providing HARQ feedback during sidelink unlicensed communications. Accordingly, at step 802, a first UE may first determine that the first UE is going to be receiving configuration information for PSFCH resources. Here, the configuration information may include information that may be used to map the PSSCH to a plurality of PSFCH resource such as, mapping PSSCH 7 to a first and second PSFCH 7 resource as described above with reference to FIG. 6. In some embodiments, at step 803, the first UE may determine that the second UE is to receive a signal (e.g., HARQ feedback) from the first UE. In other words, the first UE may be configured to determine whether the second UE is expecting or is requiring a signal such as the HARQ feedback before the second UE will begin to transmit data files or data packets to the first UE. Next, at step 804, the first UE may perform a first LBT sensing over the first PSFCH out of the plurality of PSFCH resources in response to determining that the first UE is going to receive configuration information. At step 806, the first UE determines whether the first LBT sensing has succeeded in time or failed to succeed. In response to determining that the first LBT failed, the first UE may then transmit the signal, such as for example, a HARQ feedback, which the second UE is expecting to receive, over a second PSFCH resource. As previously described, the HARQ feedback may be an ACK/NACK. In some embodiments, the transmitted signal may be some other types of signal such as inter-UE coordination (IUC) signals. In some embodiments, if the first LBT sensing failed, the first UE may perform a second LBT sensing over the second PSFCH resource before transmitting the HARQ feedback over the PSFCH resource.

Figures 9, 10:
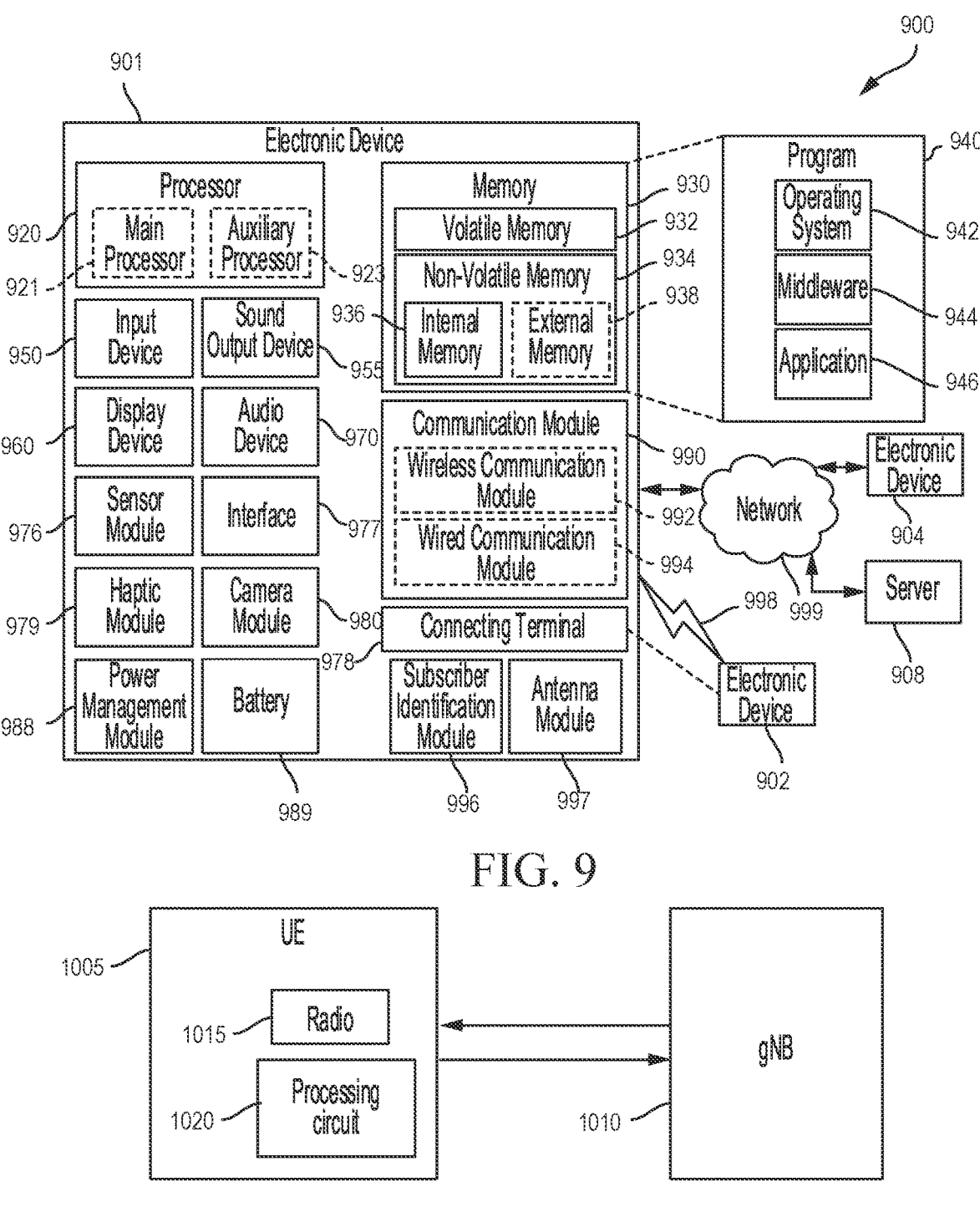
FIG. 9 is a block diagram of an electronic device in a network environment, according to various embodiments of the present disclosure.
FIG. 10 is a example system including a UE and a gNB in communication with each other, according to various embodiments of the present disclosure.

FIG. 9 is a block diagram of an electronic device in a network environment 900, according to an embodiment. Referring to FIG. 9, an electronic device 901 in a network environment 900 may communicate with an electronic device 902 via a first network 998 (e.g., a short-range wireless communication network), or an electronic device 904 or a server 908 via a second network 999 (e.g., a long-range wireless communication network). The electronic device 901 may communicate with the electronic device 904 via the server 908. The electronic device 901 may include a processor 920, a memory 930, an input device 940, a sound output device 955, a display device 960, an audio module 970, a sensor module 976, an interface 977, a haptic module 979, a camera module 980, a power management module 988, a battery 989, a communication module 990, a subscriber identification module (SIM) card 996, or an antenna module 994. In one embodiment, at least one (e.g., the display device 960 or the camera module 980) of the components may be omitted from the electronic device 901, or one or more other components may be added to the electronic device 901. Some of the components may be implemented as a single integrated circuit (IC). For example, the sensor module 976 (e.g., a fingerprint sensor, an iris sensor, or an illuminance sensor) may be embedded in the display device 960 (e.g., a display).

The processor 920 may execute software (e.g., a program 940) to control at least one other component (e.g., a hardware or a software component) of the electronic device 901 coupled with the processor 920 and may perform various data processing or computations.

As at least part of the data processing or computations, the processor 920 may load a command or data received from another component (e.g., the sensor module 976 or the communication module 990) in volatile memory 932, process the command or the data stored in the volatile memory 932, and store resulting data in non-volatile memory 934. The processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or execute a particular function. The auxiliary processor 923 may be implemented as being separate from, or a part of, the main processor 921.

The auxiliary processor 923 may control at least some of the functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). The auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by another component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. The display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. The audio module 970 may obtain the sound via the input device 950 or output the sound via the sound output device 955 or a headphone of an external electronic device 902 directly (e.g., wired) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. The sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device 902 directly (e.g., wired) or wirelessly. The interface 977 may include, for example, a high-definition multimedia interface (HDMI), a universal serial bus (USB) interface, a secure digital (SD) card interface, or an audio interface.

A connecting terminal 978 may include a connector via which the electronic device 901 may be physically connected with the external electronic device 902. The connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or an electrical stimulus which may be recognized by a user via tactile sensation or kinesthetic sensation. The haptic module 979 may include, for example, a motor, a piezoelectric element, or an electrical stimulator.

The camera module 980 may capture a still image or moving images. The camera module 980 may include one or more lenses, image sensors, image signal processors, or flashes. The power management module 988 may manage power supplied to the electronic device 901. The power management module 988 may be implemented as at least part of, for example, a power management integrated circuit (PMIC).

The battery 989 may supply power to at least one component of the electronic device 901. The battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the AP) and supports a direct (e.g., wired) communication or a wireless communication. The communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or a standard of the Infrared Data Association (IrDA)) or the second network 999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. The antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

Commands or data may be transmitted or received between the electronic device 901 and the external electronic device 904 via the server 908 coupled with the second network 999. For example, electronic device 902 may be UE A and electronic device 901 may be UE B according to the various example embodiments described above. Each of the electronic devices 902 and 904 may be a device of a same type as, or a different type, from the electronic device 901. All or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

FIG. 10 shows a system including a UE 1005 and a gNB 1010, in communication with each other. The UE may include a radio 1015 and a processing circuit (or a means for processing) 1020, which may perform various methods disclosed herein, e.g., the method illustrated in FIG. 1. For example, the processing circuit 920 may receive, via the radio 1015, transmissions from the network node (gNB) 1010, and the processing circuit 1020 may transmit, via the radio 1015, signals to the gNB 1010.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

LIST OF ABBREVIATIONS

SL-U Sidelink Unlicensed
GP Guard Period
CP Cyclic Prefix
LBT Listen Before Talk
V2V Vehicle to Vehicle
ITS Intelligent Transport System
COT Channel Occupancy Time
SL Sidelink
UE User Equipment
SCI Sidelink Control Information
PSCCH Sidelink Shared Control Channel
PSSCH Sidelink Shared Data Channel
AGC Automatic Gain Control
TB Transport Block
HARQ Hybrid automatic repeat request
MAC CE Medium Access Control Control Element
PSFCH Physical Sidelink Feedback Channel
PRB Physical Resource Block

What is claimed is:

1. A method, comprising:
   receiving, by a first user equipment (UE), configuration information for physical sidelink feedback channel (PSFCH) resources comprising a first PSFCH resource and a second PSFCH resource;
   performing, by the first UE in response to the receiving, a check to identify if a first channel occupancy time (COT) has been shared by a second UE that covers the first PSFCH resource and to identify if a first listen-before-talk (LBT) sensing has been successful for the first PSFCH resource of the PSFCH resources;

determining that the first LBT sensing failed and a first COT was not shared, and performing a check to identify whether a second COT has been shared by the second UE that covers the second PSFCH resource and to identify if a second LBT sensing has been successful for the second PSFCH resource of the PSFCH resources; and selecting the second PSFCH resource of the PSFCH resources and transmitting a signal over the second PSFCH resource, in response to determining that the second COT was shared or the second LBT sensing was successful.

2. The method of claim 1, further comprising determining, by the first UE, that the second UE is to receive the signal from the first UE.

3. The method of claim 2, wherein the signal is a hybrid automatic repeat request (HARQ) feedback signal.

4. The method of claim 2, wherein the first PSFCH resource and the second PSFCH resource are mapped to a single physical sidelink shared data channel (PSSCH).

5. The method of claim 4, further comprising determining that one or more short control exemptions are available, and wherein the transmitting the signal over the second PSFCH resource is performed in response to the determining that one or more short control exemptions are available, without performing a second LBT sensing on the second PSFCH resource.

6. The method of claim 2, further comprising, in response to the determining that the LBT sensing for the first PSFCH resource failed, performing, by the first UE, a second LBT sensing for the second PSFCH resource.

7. The method of claim 6, wherein the second LBT sensing is performed before transmitting the signal over the second PSFCH resource.

8. The method of claim 6, wherein the transmitting the signal over the second PSFCH resource is performed in response to the determining that the LBT sensing for the second PSFCH resource succeeded.

9. The method of claim 1, wherein the transmitting the signal is performed during a sidelink communication over unlicensed frequency bands.

10. The method of claim 2, wherein the second PSFCH resource is within the second COT shared by the first UE and the second UE, the method further comprising transmitting, by the first UE, the signal on the shared second COT.

11. The method of claim 10, wherein the transmitting the signal over the second PSFCH resource is performed without performing the second LBT sensing successively on the second PSFCH resource.

12. The method of claim 1, further comprising, in response to the determining that the first LBT sensing failed, transmitting the signal with-sidelink control information (SCI).

13. A system comprising:

a first user equipment (UE), the UE comprising:

a radio; and a processing circuit, wherein the processing circuit is configured to:

receive configuration information for physical sidelink feedback channel (PSFCH) resources comprising a first PSFCH resource and a second PSFCH resource;

perform, in response to receiving the configuration information, a check to identify if a first channel occupancy time (COT) has been shared by a second UE that covers the first PSFCH resource and to identify if a first listen-before-talk (LBT) sensing has been successful for the first PSFCH resource of the PSFCH resources;

determine that the first LBT sensing failed and a first COT was not shared, and perform a check to identify whether a second COT has been shared by the second UE that covers the second PSFCH resource and to identify if a second LBT sensing has been successful for the second PSFCH resource of the PSFCH resources; and select the second PSFCH resource of the PSFCH resources and transmit a signal over the second PSFCH resource, in response to determining that the second COT was shared or the second LBT sensing was successful.

14. The system of claim 13, wherein the processing circuit is further configured to determine that the second UE is to receive the signal from the first UE.

15. The system of claim 13, wherein the signal is a hybrid automatic repeat request (HARQ) feedback signal.

16. The system of claim 13, wherein the first PSFCH resource and the second PSFCH resource are mapped to a single physical sidelink shared data channel (PSSCH).

17. The system of claim 16, wherein the processing circuit is further configured to determine that one or more short control exemptions are available, and wherein the transmitting the signal over the second PSFCH resource is performed in response to the determining that one or more short control exemptions are available, without performing a second LBT sensing on the second PSFCH resource.

18. The system of claim 13, wherein in response to the determination that the LBT sensing for the first PSFCH resource failed, the processing circuit is further configured to perform a second LBT sensing for the second PSFCH resource.

19. The system of claim 18, wherein processing circuit is further configured to perform the second LBT sensing before transmitting the signal over the second PSFCH resource.

20. The system of claim 18, wherein in response to the determination that the LBT sensing for the second PSFCH resource succeeded, the processing circuit is further configured to transmit the signal over the second PSFCH resource.

21. The system of claim 13, wherein the transmitting the signal is performed during a sidelink communication over unlicensed frequency bands.

22. The system of claim 14, wherein the second PSFCH resource is within the second COT shared by the first UE and the second UE, and the processing circuit is further configured to transmit the signal on the shared second COT.

23. The system of claim 17, wherein the transmitting of the signal over the second PSFCH resource is performed without performing the second LBT sensing successively on the second PSFCH resource.

24. The system of claim 13, wherein in response to the determination that the first LBT sensing failed, the processing circuit is further configured to transmit the signal with sidelink control information (SCI).

* * * * *